US012103990B2

(12) United States Patent
Kean et al.

(10) Patent No.: US 12,103,990 B2
(45) Date of Patent: Oct. 1, 2024

(54) AQUEOUS DISPERSION OF (METH)ACRYLIC POLYMER AND POLYSILSESQUIOXANE NANO PARTICLES

(71) Applicants: Rohm and Haas Company, Collegeville, PA (US); Dow Silicones Corporation, Midland, MI (US); Dow Global Technologies LLC, Midland, MI (US)

(72) Inventors: Zachary Kean, Midland, MI (US); Steven Swier, Midland, MI (US); Arnold S. Brownell, Lansdale, PA (US)

(73) Assignees: Rohm and Haas Company, Collegeville, PA (US); Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 477 days.

(21) Appl. No.: 17/299,006

(22) PCT Filed: Mar. 5, 2020

(86) PCT No.: PCT/US2020/021180
§ 371 (c)(1),
(2) Date: Jun. 2, 2021

(87) PCT Pub. No.: WO2020/185511
PCT Pub. Date: Sep. 17, 2020

(65) Prior Publication Data
US 2022/0049024 A1    Feb. 17, 2022

Related U.S. Application Data

(60) Provisional application No. 62/816,934, filed on Mar. 12, 2019.

(51) Int. Cl.
*C08F 2/20* (2006.01)
*C08F 220/14* (2006.01)
*C08K 3/34* (2006.01)
*C08K 7/16* (2006.01)
*C09D 133/12* (2006.01)

(52) U.S. Cl.
CPC ............. *C08F 2/20* (2013.01); *C08F 220/14* (2013.01); *C08K 3/34* (2013.01); *C08K 7/16* (2013.01); *C09D 133/12* (2013.01)

(58) Field of Classification Search
CPC . C08F 2/20; C08F 220/14; C08K 3/34; C08K 7/16; C09D 133/12; C08G 77/045
USPC ........................................................ 524/560
See application file for complete search history.

(56) References Cited

U.S. PATENT DOCUMENTS

| 4,324,712 | A | 4/1982 | Vaughn, Jr. |
| 4,778,624 | A | 10/1988 | Ohashi et al. |
| 2007/0225434 | A1 | 9/2007 | Lichtenhan et al. |
| 2010/0075245 | A1* | 3/2010 | Watanabe .......... G03G 9/08702 430/110.4 |
| 2010/0248115 | A1* | 9/2010 | Ikami .................. G03G 9/0804 430/105 |
| 2017/0267853 | A1 | 9/2017 | Lichtenhan et al. |

FOREIGN PATENT DOCUMENTS

| CN | 103626933 | 3/2014 |
| EP | 889071 | 1/1999 |
| JP | 1172473 | 7/1989 |
| WO | 2007052260 | 5/2007 |

OTHER PUBLICATIONS

Arkhireeva, et al., "A versatile route to silsesquioxane nanoparticles from organically modified silane precursors", J. Non-Crystallin Solids, (2005) 351, 1688-1695.
Baumann, et al., "On the Preparation of Organosilicon p-Spheres: A Polycondensation in p-Emulsion?", Macromolecules 1994, 27, 6102-6105.
Bozorg, et al, "Characterization and protective performance of acrylic-based nanocomposite coating reinforced with silica nanoparticles", Materials and Corrosion, (2017), 68, p. 725-730.
Choi, et al., "Formation and Characterization of Monodisperse, Spherical Organo-Silica Powders from Organo-Alkoxysilane-Water System", J. Am. Ceram. Soc., (1998) 81(5), 1184-88.
Dashtizadeh, et al., "Modification and improvement of acrylic emulsion paints by reducing organic raw materials and using silica nanocomposite", J. Polym. Eng., (2013) 33(4), 357-367.
Fielding, et al., "All-Acrylic Film-Forming Colloidal Polymer/ Silica Nanocomposite Particles Prepared by Aqueous Emulsion Polymerization", Langmuir, (2011) 27, 11129-11144.
Noda, et al., "A facile preparation of spherical methylsilsesquioxane particles by emulsion polymerization", Inorganica Chimica Acta (1997) 263, 149-153.
Sankaraiah, et al., "Preparation and Characterization of Surface-Functionalized Polysilsesquioxane Hard Spheres in Aqueous Medium". Macromolecules (2008) 41, 6195-6204.
Yari, et al. "Tribological properties and scratch healing of a typical automotive nano clearcoat modified by a polyhedral oligomeric silsesquioxane compound", European Polymer Journal, 2014, vol. 60, p. 79-91.

* cited by examiner

*Primary Examiner* — Hannah J Pak
(74) *Attorney, Agent, or Firm* — Steven W. Mork

(57) ABSTRACT

An aqueous dispersion containing (meth)acrylate polymer particles and substituted silsesquioxane-based particles dispersed in an aqueous carrier, wherein: (a) the substituted silsesquioxane-based particles have an volume-average size of 5 nanometers or more and at the same time less than 500 nanometers as determined by dynamic light scattering; and (b) the substituted silsesquioxane-based particles are substituted only with one or more than one moiety selected from a group consisting of alkyl, aryl, hydroxyl, trace amounts of alkoxy and combinations thereof and contain 50 mole-percent or less hydroxyl substitution in the form silanol functionalities relative to moles of substituted silsesquioxane-based particle as determined by infrared spectroscopy.

7 Claims, No Drawings

AQUEOUS DISPERSION OF (METH)ACRYLIC POLYMER AND POLYSILSESQUIOXANE NANO PARTICLES

BACKGROUND OF THE INVENTION

Field of the Invention

The present invention relates to an aqueous dispersion of (meth)acrylic polymer particles and polysilsesquioxane nano particles. The dispersion is useful as a coating material.

INTRODUCTION

A common challenge for (meth)acrylic coatings is block resistance. Blocking is adhesion between coatings that are in contact with one another for a period of time. Blocking is generally undesirable in a coating. When two articles contact one another (such as a window and a window frame), it is often desirable for the articles to remain free to move with respect to one another. If the articles are coated with a paint, for instance, it is desirable that the paint have block resistance to inhibit adhesion between the coated articles.

Block resistance in (meth)acrylic coatings can be enhanced by including micron-sized inert fillers. However, micron sized fillers tend to affect the appearance of a coating by introducing a matte appearance due to enhanced surface roughness caused by the fillers scattering visible light. It is desirable to avoid matte-inducing fillers in coatings intended to have a glossy appearance.

Fluorinated surfactants are also known for use in establishing block resistance in coatings. However, there is a desire to move away from fluorinated materials.

It is therefore desirable to identify a composition for (meth)acrylic polymer coatings that demonstrates block resistance without requiring fluorinated surfactants. It is yet more desirable to identify such a composition that does not materially impact 60 degree gloss for the coating.

BRIEF SUMMARY OF THE INVENTION

The present invention offers a solution to providing an (meth)acrylic polymer coating that demonstrates block resistance without requiring fluorinated surfactants. Surprisingly, the present invention further provides a solution to solving the aforesaid problem that diminishes 60° gloss by 10% or less, preferably 5% or less, even more preferably 1% or less and yet more preferably does not diminish and most preferably increases 60 degree)(° gloss over the coating without silsesquioxane-based particles.

The present invention is a result of discovering that when silsesquioxane-based particles having a size of 5 nanometers (nm) or greater, preferably 20 nm or greater and less than 500 nm, preferably 400 nm or less, more preferably 200 nm or less are dispersed in an aqueous (meth)acrylic dispersion the resulting dispersion serves as a coating formulation that forms a coating demonstrating greater block resistance, generally without significant diminishing of gloss, and in some cases increasing gloss, relative to the same coating without the substituted silsesquioxane-based particles.

In a first aspect, the present invention is an aqueous dispersion comprising (meth)acrylate polymer particles and substituted silsesquioxane-based particles dispersed in an aqueous carrier, wherein: (a) the substituted silsesquioxane-based particles have an volume-average size of 5 nanometers or more and at the same time less than 500 nanometers as determined by dynamic light scattering; and (b) the substituted silsesquioxane-based particles are substituted only with one or more than one moiety selected from a group consisting of alkyl, aryl, hydroxyl, trace amounts of alkoxy and combinations thereof and contain 50 mole-percent or less hydroxyl substitution in the form silanol functionalities relative to moles of substituted silsesquioxane-based particle as determined by infrared spectroscopy.

In a second aspect, the present invention is a method comprising the step of applying the aqueous dispersion of the first aspect to a surface.

The aqueous dispersions of the present invention are useful for preparing polyacrylic (that is, poly (meth)acrylate) coatings that have surprising reduce blocking with similar gloss characteristics as compared to a similar polyacrylic coating free of substituted silsesquioxane-based particles.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

Products identified by their tradename refer to the compositions available from the suppliers under those tradenames on 1 Oct. 2018.

"Multiple" means two or more. "And/or" means "and, or as an alternative". All ranges include endpoints unless otherwise indicated.

The present invention is an aqueous dispersion, which means it has an aqueous continuous phase referred to herein as an aqueous carrier. The aqueous carrier can be water or a mixture of water and one or more than one other component. Desirably, water is a continuous phase in the aqueous carrier.

The aqueous dispersion comprising (meth)acrylate polymer particles dispersed in the aqueous carrier. The "(meth)acrylate" polymer can be an acrylate polymer, a methacrylate polymer, a copolymer comprising acrylates and methacrylates, or a blend of any combination thereof. Acrylate polymer have structural units of an acrylate monomer ("acrylate units"). Methacrylate polymers have structural units of a methacrylate monomer ("methacrylcate units"). A copolymer comprising acrylates and methacrylates contain structural units of both acrylate and methacrylate monomers. A "structural unit" of a monomer is the remnant of the monomer after polymerization.

Desirably the (meth)acrylate polymer comprises 30 or more, preferably 50 or more and most preferably 80 or more weight-percent (wt %) structural units of acrylate and methacrylate monomers. Examples of suitable acrylate and methacrylate monomers include methyl methacrylate, ethyl methacrylate, butyl methacrylate, ureido methacrylate, ethyl acrylate, butyl acrylate, 2-ethylhexyl acrylate, and 2-propylheptyl acrylate. Preferred combinations of acrylate and methacrylate monomers include methyl methacrylate and one or more monomers selected from the group consisting of ethyl acrylate, butyl acrylate, ureido methacrylate, 2-propylheptyl acrylate, and 2-ethylhexyl acrylate. More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and butyl acrylate being most preferred.

(Meth)acrylate polymers can comprise polymer units other than acrylate units and methacrylate units—that is, (meth)acrylate polymers can be copolymers of additional monomers other than acrylate and methacrylate monomers. Examples of suitable additional monomers include styrene, acetoacetoxyethyl methacrylate, acrylonitrile, acrylamides, methacrylamides, and 2-acrylamido-2-methylpropane sulfonic acid. The (meth)acrylate polymers desirably comprise 0.2 or more, preferably 0.5 or more and more preferably one or more and at the same time 5 or less, preferably 3 or less wt % of a structural unit of ethylenically unsaturated carboxylic acid monomers such as acrylic acid, methacrylic acid or itaconic acid.

The aqueous dispersion further comprises substituted silsesquioxane-based particles dispersed in the aqueous carrier. "Silsesquioxane-based" means the particles comprise 50 mole-percent (mol %) or more T units based on the sum of M, D, T and Q units (as defined below) in the molecule. Preferably, the silsesquioxane-based particles comprise 60 mol % or more, 70 mol % or more, 80 mol % or more, 90 mol % or more and can be 100 mol % T units based on the sum of M, D, T and Q units. "Substituted" means that the silicon is bound to pendant group other than hydrogen and desirably is free having hydrogen bound directly to silicon. "Pendant" groups are groups extending off from the siloxane, $(SiO)_n$, backbone of the silsesquioxane polymer.

The substituted silsesquioxane-based particles of the present invention are substituted only with one or more than one group selected from alkyl, aryl, hydroxyl, trace amounts of alkoxy and combinations thereof. That means each pendant group is independently selected from a group consisting of alkyl, aryl, hydroxyl trace amount of alkoxy and combinations thereof. Desirably, the alkyl has from one to 18 carbon atoms and more desirably is selected from a group consisting of methyl, ethyl, propyl, butyl, hexyl, octyl, decyl, dodecyl, hexadecyl and octadecyl. Most desirably the alkyl group is methyl. Desirably, the aryl group has from 6 to 18 carbons atoms and may be substituted with halogen atoms or be free of halogen atoms. More desirably, the aryl group is selected from a group consisting of phenyl, naphthyl, benzyl, tolyl, xylyl, xenyl, methylphenyl, 2-phenylethyl, 2-pheynl-2-methylethyl, chlorophenyl, bromophenyl and fluorophenyl. Most desirably, the aryl group is phenyl. Preferably, the substituted silsesquioxane-based particles are free of acrylate copolymerized to the substituted silsesquioxane-based particles. The substituted silsesquioxane-based particles can contain a trace amount of alkoxy (—OR) substitution residual from the monomers used to prepare the substituted silsesquioxane-based particles. The alkoxy is typically a methoxy or ethoxy, more typically methoxy. "Trace" amount means less than 5 mol %, preferably less than 3 mol %, more preferably 2.5 mol % or less, 2 mol % or less, 1.5 mol % or less, 1.0 mol % or less, and even 0.5 mol % or less. The substituted silsesquioxane-based particles can be free of any measurable alkoxy substitution.

The extent of hydroxyl substitution is limited to 50 mol % or less, and can be 40 mol % or less, 30 mol % or less, 20 mol % or less, 10 mol % or less based and can be zero mol % based on moles of substituted silsesquioxane-based particles. Hydroxyl substitution is in the form of silanol functionalities. Determine mol % hydroxyl substitution by infrared spectroscopy by comparing the —OH peak height at 3373 cm$^{-1}$ for a sample of substituted silsesquioxane-based particles to the —OH peak height at 3373 cm$^{-1}$ for a standard having the same siloxane unit composition (M, D, T, Q, R composition) of known Si—OH content as determined by $^{29}$Si NMR.

The substituted silsesquioxane-based particles have the composition of formula I:

$$M_a D_b T_c Q_d \tag{I}$$

where:
$M = R_3Si(OR')_w O_{(1-w)/2}$
$D = R_2Si(OR')_x O_{(2-x)/2}$
$T = RSi(OR')_y O_{(3-y)/2}$
$Q = Si(OR')_z O_{(4-z)/2}$ R is independently in each occurrence selected from a group consisting of alkyl and aryl, preferably from a group consisting of methyl and phenyl.
R' is in each occurrence selected from a group consisting of alkyl and hydrogen, preferably from a group consisting of methyl, ethyl and hydrogen.
w has a value in a range of zero to less than one;
x has a value in a range of zero to less than two;
y has a value in a range of zero to less than three;
z has a value in a range of zero to less than four; and
R', w, x, y and z are such that the hydroxyl concentration resulting from R' being hydrogen is within the concentration limits set forth above and the alkoxy concentration resulting from R' being alkyl keeps the alkoxy concentration in the "trace" amount range defined previously above.
a=a value of zero or greater and 0.4 or less;
b=a value of zero or greater and 0.3 or less;
c=a value of 0.5 or greater and 1.0 or less;
d=a value of zero or greater and 0.1 or less; and
a+b+c+d=1.0

The subscripts a, b, c and d refer to the average mole fraction of the M, D, T and Q units respectively in the substituted silsesquioxane-based particles. Determine a, b, c and d from the mole ratio of monomer feed used to prepare the substituted silsesquioxane-based particles. If the monomer feed is unknown, determine a, b, c and d using $^{29}$Si nuclear magnetic resonance spectroscopy.

Subscript "a" can be zero. Subscript "d" can be zero. Desirably, subscripts "a" and "d" are zero so the substituted silsesquioxane-based particles have the composition of formula II:

$$D_b T_c \tag{II}$$

where "b" is zero or greater and less than 0.3, "c" is 0.7 or greater and 1.0 or less.

Subscripts a, c and d can all be zero and b can be 1.0, corresponding to a substituted silsesquioxane-based particles consisting of only "T" units.

The substituted silsesquioxane-based particles can be any shape. The substituted silsesquioxane-based particles are generally spherical. The substituted silsesquioxane-based particles have a volume-average size of 5 nanometers (nm) or greater and can be 10 nm or greater, 20 nm or greater, 25 nm or greater, 30 nm or greater, 40 nm or greater, 50 nm or greater, 60 nm or greater, 70 nm or greater, 80 nm or greater, 90 nm or greater, even 100 nm or greater and at the same time have a volume-average size of less than 500 nm, and can be 400 nm or less, 350 nm or less, 300 nm or less, 250 nm or less, 200 nm or less, 150 nm or less, 140 nm or less, 130 nm or less, 120 nm or less, 110 nm or less and even 100 nm or less. Determine the volume-average size of the substituted silsesquioxane-based particles using dynamic light scattering. To determine particle size determination by dynamic light scattering preparing a 1-5 weight-percent solution of sample particles and add the solution to polytetrafluoroethylene cell. Collect data using a 30 second run time with a Microtrac Nanotrac Waver particle Size Analyzer. Collect data until three consisting results are achieved.

Use an analysis method for transparent, spherical, 1.42 refractive index particles. Resulting particle sizes are volume average particle sizes.

The aqueous dispersion of the present invention desirably contains 0.20 wt % or more, preferably 0.25 wt % or more, 0.30 wt % or more, 0.40 wt % or more 0.50 wt % or more and at the same time is generally 25 wt % or less, typically 20 wt % or less, 15 wt % or less, 10 wt % or less, 5 wt % or less, 4 wt % or less, ally 3 wt % or less, 2 wt % or less, 1.5 wt % or less and can be one wt % or less, 0.90 wt % or less, 0.80 wt % or less and even 0.70 wt % or less substituted silsesquioxane-based particles based on aqueous dispersion weight.

The aqueous dispersion of the present invention desirably contains 10 wt % or more and can contain 20 wt % or more, 30 wt % or more, 40 wt % or more, 50 wt % or more and even 60 wt % or more while at the same time typically contains 80 wt % or less, preferably 75 wt % or less (meth)acrylate polymer particles by weight of aqueous dispersion weight.

The aqueous dispersion can comprise one or more than one additional component other than the acrylate polymer particles and substituted silsesquioxane-based particles. Each additional component can either dispersed or dissolved in the aqueous carrier. Examples of suitable additional components include any one or any combination of more than one of the following: surfactants and dispersants (non-ionic, anionic, cationic or any combination thereof), pigments and fillers (such as titanium dioxide and clays), rheology modifiers, stabilizers (such as polyvinylpyrrolidone), coalescent aids (such as 2,2,4-trimethyl-1,3-pentanediol monoisobutyrate, ester alcohols, glycol ethers), and defoamers (such as polysiloxanes and hydrophobic solids in polyglycol).

The aqueous dispersions of the present invention are useful for preparing polyacrylic coatings that have surprising low blocking while maintaining similar gloss characteristics to a comparable polyacrylic coating free of substituted silsesquioxane-based particles.

Prepare a polyacrylate coating form the aqueous dispersion by applying the aqueous dispersion of the present invention to a surface. Apply the aqueous dispersion in any manner suitable for acrylic dispersion including brushing, spraying, and wiping. Once the dispersion is applied to a surface, water in the aqueous carrier evaporates drawing the (meth)acrylate polymer particles together, facilitating coalescence of the (meth)acrylate polymer particles into an acrylic film. At least a portion of the substituted silsesquioxane-based particles migrate to the surface of the coating as the water evaporates to provide substituted silsesquioxane-based particles on the surface of the resulting acrylic polymer coating, which is believed to enhance the block resistance of the acrylic polymer coating. It has been discovered that the substituted silsesquioxane-based particles can tend to agglomerate into clusters scattered across the surface of the acrylic polymer coating, which is believed to enhance the block-resistant properties of the resulting acrylic polymer coating.

EXAMPLES

The following examples are illustrative of the present invention and are not necessarily meant to define to full scope of the present invention.

Characterization of the Examples and Comparative Examples herein include Gloss evaluation and Block Resistance Characterization evaluation. Use the following procedures for the characterizations:

Gloss. Prepare samples for gloss evaluation by drawing down a 3 mil thick wet film on Leneta charts (WB plain white) and allowing them to age at 23° C. and 50% relative humidity for 24 hours. The, determine gloss in a manner similar to ASTM D-523-89 using a micro-TRI-gloss meter from BYK Gardner. Determine gloss values at angles of 20 degrees (20°) and 60 degrees (60°).

Block Resistance. Prepare samples for block resistance evaluation by drawing down 10 mil thick wet films on cold rolled steel or aluminum Q-panels and allowing the films to age 24 hours as 23° C. and 50% relative humidity prior to characterization. Characterize block resistance according to ASTM D4946-89 peel block resistance testing. For each coating, cut eight 3.8 centimeter by 3.8 centimeter square from film samples that are 24 hours old.

For the room temperature (RT) testing, stack two square samples face-to-face with the coatings contacting one another at room temperature and place a No. 8 rubber stopper on top of the stack of two square samples and then place a one-kilogram weight on top of the stopper. After 30 minutes at room temperatures, remove the weight and stopper and evaluate for room temperature block resistance by peeling apart the stacked sample with a slow and steady force. Rate the result according to the rating in Table 1.

For hot block testing, place the square sample in an oven at 50° C. on a flat metal plate along with the No. 8 rubber stopper and one-kilogram weight to equilibrate to the 50° C. temperature. Once equilibrated, stack two square samples face-to-face with the coatings contacting one another in the oven. Place the temperature equilibrated stopper on top of the stack of square sample and then place the temperature equilibrated one-kilogram weight on top of the stopper and leave them all in the oven at 50° C. for 30 minutes. Then, remove the samples from the oven and evaluate for hot block resistance by peeling apart the stacked samples with a slow and steady force. Rate the result according to the rating in Table 1.

TABLE 1

| Rating | Description of tack and seal |
|---|---|
| 10 | No tack, perfect |
| 9 | Trace tack, excellent |
| 8 | Slight tack, very good |
| 7 | Slight tack, good |
| 6 | Moderate tack, good |
| 5 | Moderate tack, fair |
| 4 | Severe tack, no seal, fair |
| 3 | 5-25% seal, poor |
| 2 | 25-50% seal, poor |
| 1 | 50-75% seal, poor |
| 0 | Complete seal, very poor |

Substituted Silsesquioxane-Based Particle Synthesis

Table 2 describes the components for preparing each of substituted silsesquioxane-based particles P1-P8 as well as characterization of the particles. Values identify grams (g) of component used to prepare each substituted silsesquioxane-based particle. Characterize the particles as described previously herein.

Prepare substituted silsesquioxane-based particles for the examples by combining into a glass bottle the water, ammonium hydroxide (as a 29 wt % solution), surfactant and, if used, stabilizer components. While stirring with a polytetrafluoroethylene magnetic stirring bar add the monomer components (if more than one monomer component, add them simultaneously) at the addition rate stated in Table 2, provided in milliliters per minute. Continue to stir for one hour after monomer addition is complete. The result is an aqueous dispersion of substituted silsesquioxane-based particles.

TABLE 2

| Component | Description | P1 | P2 | P3 | P4 | P5 | P6 | P7 | P8 |
|---|---|---|---|---|---|---|---|---|---|
| Water | | 250 | 250 | 250 | 72.3 | 72.3 | 72.3 | 72.3 | 72.3 |
| Ammonium Hydroxide solution | 29 wt % solution of ammonium hydroxide | 15.5 | 15.5 | 15.5 | 0.23 | 0.23 | 0.23 | 0.23 | 0.23 |
| Surfactant | Nonionic secondary alcohol ethoxylate with 15 ethylene oxide units (TERGITOL ™ 15-S-15 surfactant) | 0 | 10.33 | 0 | 0 | 0 | 0 | 0 | 0 |
| Surfactant | Nonionic secondary alcohol ethoxylate with 41 ethylene oxide units (TERGITOL ™ 15-S-40 surfactant) | 10.3 | 0 | 3.44 | 0 | 0 | 0 | 0 | 0 |
| Surfactant | Alkyldiphenyloxide disulfonate (DOWFAX ™ 2A1 surfactant) | 0 | 0 | 0 | 1.16 | 1.16 | 1.16 | 1.16 | 1.16 |
| Stabilizer | Polyvinylpyrrolidone (40,000 molecular weight) | 0 | 0 | 0 | 0.12 | 0.12 | 0.12 | 0.12 | 0.12 |
| Monomer | Methyltrimethoxysilane | 29.5 | 29.5 | 29.5 | 0 | 8.6 | 12.8 | 15.4 | 14.5 |
| Monomer | Phenyltrimethoxysilane | 0 | 0 | 0 | 17.1 | 8.6 | 4.3 | 1.7 | 0 |
| Monomer | Dimethyldimethoxylsilane | 0 | 0 | 0 | 0 | 0 | 0 | 0 | 2.6 |
| Monomer Addition Rate (milliliters per minute) | | 60 | 60 | 60 | 0.47 | 0.47 | 0.47 | 0.47 | 0.47 |
| Particle Characterization | | | | | | | | | |
| Volume-Average Particle Size (nm) | | 22 | 30 | 362 | 9 | 22 | 29 | 51 | 123 |
| Mol % hydroxyl relative to moles of Si | | 23.4 | 25.8 | 25.7 | <50 | NM** | <50 | <50 | <50 |
| Mol % alkoxy relative to moles Si* | | <2.1 | <2.1 | <2.1 | <4.1 | <2.9 | <2.5 | <2.3 | <2.5 |

*No alkoxy was evident in characterization so the concentration is below the measurement threshold, which is the value reported.
**mol % hydroxyl was not measured for this sample.
TERGITOL and DOWFAX are trademarks of The Dow Chemical Company.

(Meth)acrylate Aqueous Dispersions

The examples each include one of four (meth)acrylate aqueous dispersions: Dispersion A, Dispersion B, Dispersion C or Dispersion D. Each of the four (meth)acrylate aqueous dispersions are formulated as paint formulations where the (meth)acrylate polymer particles are present as the binder. The formulations for each of the (meth)acrylate aqueous dispersions is given below. Prepare the dispersion by mixing the component listed in the formulation tables together to form a paint formulation in any method common in the paint industry.

Dispersion A

| Component | Description | Grams |
|---|---|---|
| Titanium dioxide | KRONOS ™ 4311 multipurpose rutile titanium dioxide slurry available from Kronos International, Inc. | 155.62 |
| TAMOL ™2011 Dispersant | Hydrophobic copolymer dispersant available from Rohm and Hass Company. | 4.40 |
| Binder A | (meth)acrylic copolymer binder prepared as described herein below. | 310.34 |
| BYK ™-024 Defoamer | VOC-free silicone-containing defoamer that is a mixture of foam-destroying polysiloxanes and hydrophobic solids in polyglycol available from BYK Additives & Instruments. | 1.50 |
| TERGITOL 15-S-20 nonionic surfactant | Secondary alcohol ethoxylate with 20 moles of ethylene oxide, 49 centipoise viscosity at 25° C. and a density of 1.038 grams per millimeter at 20° C.. Available from The Dow Chemical Company. | 2.00 |
| TEXANOL ™ ester alcohol | Ester alcohol coalescent available from Eastman Chemical Corporation. | 7.06 |
| OPTIFILM ™ enhancer 400 | Coalescent aid available from Eastman Chemical Corporation. | 2.83 |
| ACRYSOL ™ RM-8W nonionic HEUR rheology modifier | Hydrophobically modified polyethylene oxide urethane nonionic urethane rheology modifier that is 17.5% active solids, <3500 centipoise Brookfield viscosity with a specific gravity of 1.04. Available from The Dow Chemical Company. | 1.10 |

-continued

| Component | Description | Grams |
|---|---|---|
| ACRYSOL ™ RM-3000 nonionic HEUR rheology modifier | Hydrophobically modified polyethylene oxide urethane nonionic urethane rheology modifier that is 18.5% active solids, <4000 centipoise Brookfield LVF#2, 6 rpm viscosity with a wet density of 1.045. Available from The Dow Chemical Company. | 7.59 |
| CAPSTONE ™ FS-63 water-soluble anionic fluorosurfactant | Fluorosurfactant having a pH of 7.5-9.0, specific gravity of 1.1 gram per milliliter, 35% solids, 20% isopropyl alcohol 45% water and flash point of 26° C.. Available from DuPont. | 0.52 |
| Water | water | 34.70 |

KRONOS is a trademark of Kronos International, Inc. TAMOL is a trademark of the Rohm and Haas Company. BYK is a trademark of BYK-Chemi GmbH Corporation. TEXANOL and OPTIFILM are trademarks of Eastman Chemical Corporation. ACRYSOL is a trademark of The Dow Chemical Company. CAPSTONE is a trademark of the Chemours Company FC.

Synthesis of Binder A.

Mix together deionized water (130 g) DISPONIL™ FES 993 surfactant (28.9 g, 30 wt % active fatty alcohol polyglycol ether sulphate, sodium salt), butyl acrylate (96.9 g), methyl methacrylate (411.06 g), sodium 4-vinylbenzenesulfonate (2.27 g, 90 wt % active) and n-dodecyl mercaptan (1.28 g) to form a first monomer emulsion. DISPONIL is a trademark of Cognis IP Management GmbH.

Separate from the first monomer emulsion, mix together water (300 g), DISPONIL™ FES 993 surfactant (47.6 g, 30 wt % active), butyl acrylate (357 g), ethyl acrylate (357 g), methyl methacrylate (299.2 g) acetoacetoxy ethyl methacrylate (143.16 g, 95 wt % active) phosphoethyl methacrylate (30.6 g, 60 wt % active) odium 4-vinylbenzenesulfonaet (11.33 g, 90 wt % active) and n-dodecyl mercapton (5.95 g) to form a second monomer emulsion.

To a 5-liter, four neck round bottom flask equipped with a paddle stirrer, a thermometer, nitrogen inlet and a reflux condenser, add deionized water (1100 g) and DISPONIL™ FES 933 surfactant (28.33 g, 30 wt % active). Heat the contents of the flask to 85° C. under nitrogen. While stirring, add 105 g of the first monomer emulsion, quickly followed by adding an aqueous solution of ammonium persulfate (5.1 g) dissolved in deionized water (25 g), and followed by a rinse of deionized water (5 g). Stir for 10 minutes and then over the course of 35 minutes sequentially add the remainder of the first monomer emulsion and then a solution containing ammonium persulfate (0.52 g) dissolved in deionized water (25 g). Rinse the containing that held the first monomer emulsion with 25 g deionized water and add it to the flask. Maintain at 85° while mixing for 15 minutes. Over the course of 80 minutes, sequentially add the second monomer emulsion followed by a solution containing ammonium persulfate (1.18 g) dissolved in deionized water (55 g). Rinse the container that held the second monomer emulsion with 25 g deionized water and add it to the flask. Hold at 85° C. for 10 minutes. Add a solution containing ammonium hydroxide (10 g, 29 wt % active) and deionized water (10 g) over 5 minutes. Cool the flask to 70° C. and add a catalyst/activator pair (such as tert-butyl hydroperoxide/isoascorbic acid) to the flask to reduce residual monomer. Neutralize to pH 9.5 with a dilute solution of ammonium hydroxide to obtain Binder A. Binder A has a solids content of 45.3 wt %. The (meth)acrylate polymer particles in Binder A have a volume average particle size of 85 nm.

Dispersion B

Dispersion B is identical to Dispersion A except there is no CAPTSTONE FS-63 water-soluble anionic fluorosurfactant and the amount of water is 35.22 g.

Dispersion C

| Component | Description | Grams |
|---|---|---|
| Titanium dioxide | TIONA ™ 595 multipurpose chloride-process titanium dioxide pigment available from Cristal Pigment UK Limited. | 300 |
| TAMOL ™ 2011 Dispersant | Hydrophobic copolymer dispersant available from Rohm and Hass Company. | 8.3 |
| water | water | 18.1 |
| RHOPLEX ™ HG-98B binder | Acrylic emulsion polymer that is 45 wt% solids with a pH of 8.5-9.5, a Brookfield Viscosity of 500 centipoise, a minimum film formation temperature of 24° C., and a dry polymer specific gravity of 1.14 grams per cubic centimeter (g/cm3). Available from Rohm and Haas Company. | 583 |
| BYK ™-024 Defoamer | VOC-free silicone-containing defoamer that is a mixture of foam-destroying polysiloxanes and hydrophobic solids in polyglycol available from BYK Additives & Instruments. | 2.7 |
| TERGITOL 15-S-40 nonionic surfactant | Secondary alcohol ethoxylate with 41 moles of ethylene oxide, HLB of 18, 5° C. pour point, density at 30° C. of 1.072 grams per milliliter. Available from The Dow Chemical Company. | 3.6 |
| TEXANOL ™ ester alcohol | Ester alcohol coalescent available from Eastman Chemical Corporation. | 13.1 |
| ACRYSOL ™ RM-3000 nonionic HEUR rheology modifier | Hydrophobically modified polyethylene oxide urethane nonionic urethane rheology modifier that is 18.5% active solids, <4000 centipoise Brookfield LVF#2, 6 rpm viscosity with a wet density of 1.045. Available from The Dow Chemical Company. | 18.1 |
| ACRYSOL™ RM-8W nonionic HEUR rheology modifier | Hydrophobically modified polyethylene oxide urethane nonionic urethane rheology modifier that is 17.5% active solids, <3500 centipoise Brookfield viscosity with a specific gravity of 1.04. Available from The Dow Chemical Company. | 1.8 |

TIONA is a trademark of Cristal Pigment UK Limited. RHOPLEX is a trademark of Rohm and Haas Company.

Dispersion D

| Component | Description | Grams |
|---|---|---|
| Titanium dioxide | TIONA ™ 595 multipurpose chloride-process titanium dioxide pigment available from Cristal Pigment UK Limited. | 300 |
| TAMOL ™ 2011 Dispersant | Hydrophobic copolymer dispersant available from Rohm and Hass Company. | 8.3 |
| water | water | 18.1 |
| RHOPLEX ™ HG-706 binder | Acrylic emulsion polymer that is 45 wt% solids with a pH of 8.6-9.10, a Brookfield Viscosity (#2 spindle, 60 rpm) of 500 centipoise maximum, and a minimum film formation temperature of <5° C., Available from Rohm and Haas Company. | 583 |
| BYK ™-024 Defoamer | VOC-free silicone-containing defoamer that is a mixture of foam-destroying polysiloxanes and hydrophobic solids in polyglycol available from BYK Additives & Instruments. | 2.7 |
| TERGITOL 15-S-40 nonionic surfactant | Secondary alcohol ethoxylate with 41 moles of ethylene oxide, HLB of 18, 5° C. pour point, density at 30° C. of 1.072 grams per milliliter. Available from The Dow Chemical Company. | 3.6 |
| TEXANOL ™ ester alcohol | Ester alcohol coalescent available from Eastman Chemical Corporation. | 13.1 |
| ACRYSOL ™ RM-3000 nonionic HEUR rheology modifier | Hydrophobically modified polyethylene oxide urethane nonionic urethane rheology modifier that is 18.5% active solids, <4000 centipoise Brookfield LVF#2, 6 rpm viscosity with a wet density of 1.045. Available from The Dow Chemical Company. | 18.1 |
| ACRYSOL ™ RM-8W nonionic HEUR rheology modifier | Hydrophobically modified polyethylene oxide urethane nonionic urethane rheology modifier that is 17.5% active solids, <3500 centipoise Brookfield viscosity with a specific gravity of 1.04. Available from The Dow Chemical Company. | 1.8 |

Examples Using T$^M$ Particles (P1-P3)

Substituted silsesquioxane-based particles P1-P3 contain only T units. The T units are primarily substituted with methyl group, and contain only slight amounts of hydroxyl substitution as indicated in Table 2. Average volume particle sizes range from 22 nm for P1 to 118 nm for P3.

Prepare Examples by combining a substituted silsesquioxane-based particle dispersions with a (meth)acrylate dispersion and adding additional water as noted in Table 3. The additional water is to achieve the same volume solids for each Example. Prepare Examples 1-6 by combining substituted silsesquioxane-based particles P1 or P3 with (Meth)acrylate Dispersion B. Prepare Examples 7-10 by combining substituted silsesquioxane-based particles P1 or P2 with (Meth)acrylate Dispersion C. Prepare Examples 11-14 by combining substituted silsesquioxane-based particles P1 or P2 with (Meth)acrylate Dispersion D.

Characterize the Examples according to the Gloss and Block Resistance methods described above. As a reference, Comparative Example A is just Dispersion B without any substituted silsesquioxane-based particles; Comparative Example B is Dispersion C without any substituted silsesquioxane-based particles; and Comparative Example C is Dispersion D without any substituted silsesquioxane-based particles. Characterization results are in Table 4.

TABLE 3

| | Substituted Silsesquioxane-based Particle Dispersion | | (Meth)acrylate Dispersion | | Additional |
|---|---|---|---|---|---|
| Example | Identification | Grams | Identification | grams | Water (grams) |
| Comp Ex A | (none) | (none) | B | 527.64 | (none) |
| 1 | P1 | 8.15 | B | 527.64 | 27.42 |
| 2 | P1 | 16.4 | B | 527.64 | 19.46 |
| 3 | P1 | 24.85 | B | 527.64 | 11.31 |
| 4 | P3 | 8.15 | B | 527.64 | 27.42 |
| 5 | P3 | 16.4 | B | 527.64 | 19.46 |
| 6 | P3 | 24.85 | B | 527.64 | 11.31 |
| Comp Ex B | (none) | (none) | C | 47.4 | 2.6 |
| 7 | P2 | 0.88 | C | 47.4 | 1.71 |
| 8 | P1 | 1.14 | C | 47.4 | 1.44 |
| 9 | P2 | 1.75 | C | 47.4 | 0.83 |
| 10 | P1 | 2.28 | C | 47.4 | 0.3 |
| Comp Ex C | (none) | (none) | D | 47.4 | 2.6 |
| 11 | P2 | 0.88 | D | 47.4 | 1.71 |
| 12 | P1 | 1.14 | D | 47.4 | 1.44 |
| 13 | P2 | 1.75 | D | 47.4 | 0.83 |
| 14 | P1 | 2.28 | D | 47.4 | 0.3 |

TABLE 4

| | Gloss (24 Hours) | | Block Resistance | |
|---|---|---|---|---|
| Example | 20° | 60° | Room Temp | Hot Block |
| Comp Ex A | 52.9 | 74.6 | 5 | 0 |
| 1 | 51.6 | 75.0 | 5 | 1 |
| 2 | 51.8 | 74.7 | 5 | 1 |
| 3 | 53.6 | 75.1 | 5 | 4 |
| 4 | 53.0 | 75.2 | 4.5 | 1 |
| 5 | 52.7 | 75.1 | 4 | 2.5 |
| 6 | 52.5 | 75.1 | 4.5 | 4 |
| Comp Ex B | 39.3 | 72.3 | 10 | 0 |
| 7 | 34.1 | 69.7 | 10 | 1 |
| 8 | 38.4 | 71.7 | 10 | 2 |
| 9 | 27.2 | 64.3 | 9.5 | 8 |
| 10 | 38.4 | 72.2 | 9.5 | 8 |
| Comp Ex C | 34.2 | 70.3 | 8.5 | 2.5 |
| 11 | 39.3 | 72.6 | 8 | 4.5 |

TABLE 4-continued

| | Gloss (24 Hours) | | Block Resistance | |
|---|---|---|---|---|
| Example | 20° | 60° | Room Temp | Hot Block |
| 12 | 33.3 | 69.8 | 7.5 | 5 |
| 13 | 36.8 | 72 | 8 | 4.5 |
| 14 | 31.8 | 68.3 | 8 | 7.5 |

The results in Table 4 reveal that inclusion of the substituted silsesquioxane-based particles with the (meth)acrylate dispersion resulted in improvement in at least Hot Block, which is the most severe of the block resistance evaluations. In most cases, there was comparable or even improved (higher) gloss values when substituted silsesquioxane-based particles are included.

Examples Using $T^{Ph}$-Containing Particles (P4-P7)

Substituted silsesquioxane-based particles P4-P7 contain only T units. The T units are substituted with phenyl groups (P4) or a combination of phenyl and methyl groups (P5-P7), and contain only slight amounts of hydroxyl substitution as indicated in Table 2. Average volume particle sizes range from 9 nm for P4 to 51 nm for P6.

Prepare Examples by combining a substituted silsesquioxane-based particle dispersions with a (meth)acrylate dispersion and adding additional water as noted in Table 5. The additional water is to achieve the same level of solids for each Example. Prepare Examples 17-22 by combining substituted silsesquioxane-based particles selected from P4-P7 with (Meth)acrylate Dispersion A. Characterize the Examples according to the Gloss and Block Resistance methods described above. As a reference, Comparative Example D is just (Meth)acrylate Dispersion A without any substituted silsesquioxane-based particles. Characterization results are in Table 6.

TABLE 5

| | Substituted Silsesquioxane-based Particle Dispersion | | (Meth)acrylate Dispersion | | Additional |
|---|---|---|---|---|---|
| Example | Identification | Grams | Identification | grams | Water (grams) |
| Comp Ex D | (none) | (none) | A | 20 | 1.47 |
| 17 | P6 | 0.83 | A | 20 | 0.64 |
| 18 | P4 | 0.87 | A | 20 | 0.60 |
| 19 | P5 | 0.69 | A | 20 | 0.78 |
| 20 | P5 | 1.41 | A | 20 | 0.06 |
| 21 | P7 | 0.56 | A | 20 | 0.91 |
| 22 | P7 | 1.14 | A | 20 | 0.33 |

TABLE 6

| | Gloss (24 Hours) | | Block Resistance | |
|---|---|---|---|---|
| Example | 20° | 60° | (RT) | (Hot Block) |
| Comp D | 51.8 | 74 | 5 | 5 |
| 17 | 51.5 | 74.7 | 6.5 | 6 |
| 18 | 53 | 75.1 | 5.5 | 6.5 |
| 19 | 51.7 | 74.7 | 6 | 5 |
| 20 | 48.9 | 74.2 | 6.5 | 5 |
| 21 | 51.6 | 74.4 | 6.5 | 6 |
| 22 | 51 | 74.6 | 6.5 | 5.5 |

The results in Table 6 reveal that inclusion of the substituted silsesquioxane-based particles with the (meth)acrylate dispersion resulted in improvement in at least one of the block resistance evaluations. In most cases, there was comparable or even improved (higher) gloss values when substituted silsesquioxane-based particles are included.

Examples Using Mixed Siloxane Particles (P8)

Substituted silsesquioxane-based particle P8 contains only T units and D units, each substituted primarily with methyl groups with only slight amounts of hydroxyl substitution as indicated in Table 2. Average volume particle size for P8 is 123 nm.

Prepare Example 23 by combining 20 grams of (Meth)acrylate Dispersion A with 0.65 P8 and 0.82 grams water. Prepare Example 24 by combining 20 grams of (Meth)acrylate Dispersion B with 1.32 grams P8 and 0.15 grams water. In each case water is used to achieve the same level of solids for each Example.

Characterize the Examples according to the Gloss and Block Resistance methods described above. As a reference, Comparative Example D is just (Meth)acrylate Dispersion A without any substituted silsesquioxane-based particles. Example 23 has a 20° Gloss of 52.2, a 60° Gloss of 74.4, a RT Block Resistance value of 7 and a Hot Block Resistance value of 6. Example 24 has a 20° Gloss of 52.4, a 60° Gloss of 74.5, a RT Block Resistance value of 6.5 and a Hot Block Resistance value of 5.5.

The results for Examples 23 and 24 reveal that inclusion of the substituted silsesquioxane-based particles with the (meth)acrylate dispersion resulted in improvement in both of the block resistance evaluations. There was comparable or even improved (higher) gloss values when substituted silsesquioxane-based particles are included.

What is claimed is:

1. An aqueous dispersion comprising (meth)acrylate polymer particles and substituted silsesquioxane-based particles dispersed in an aqueous carrier, wherein:
   (a) the substituted silsesquioxane-based particles have a volume-average size of 5 nanometers or more and at the same time less than 500 nanometers as determined by dynamic light scattering; and
   (b) the substituted silsesquioxane-based particles are substituted only with one or more than one moiety selected from a group consisting of alkyl, aryl, hydroxyl, trace amounts of alkoxy and combinations thereof and contain 50 mole-percent or less hydroxyl substitution in the form silanol functionalities relative to moles of substituted silsesquioxane-based particle as determined by infrared spectroscopy;

and wherein the substituted silsesquioxane-based particles have the composition of formula I:

$$M_a D_b T_c Q_d \qquad (I)$$

where: M is $R_3Si(OR')_w O_{(1-w)/2}$, D is $R_2Si(OR')_x O_{(2-x)/2}$, T is $RSi(OR')_y O_{(3-y)/2}$, Q is $Si(OR')_z O_{(4-z)/2}$, R is independently in each occurrence selected from a group consisting of alkyl and aryl, R' is in each occurrence selected from a group consisting of alkyl and hydrogen, "w" has a value in a range of zero to less than one, "x" has a value in a range of zero to less than two, "y" has a value in a range of zero to less than three and "z" has a value in a range of zero to less than four wherein the selection of R', "w", "x", "y" and "z" are such that the hydroxyl concentration resulting from R' being hydrogen is 50 mole-percent or less as determined by infrared spectroscopy and the alkoxy concentration resulting from R' being alkyl is such that there is at most a trace amount of alkoxy, "a" is a value of zero or greater and 0.4 or less: "b" is a value of zero or greater and 0.3 or less; "e" has a value of 0.5 or greater and 1.0 or less: "d" has a value of zero or greater and 0.1 or less and the sum of "a", "b", "c" and "cd" is 1.0.

2. The aqueous dispersion of claim 1, wherein the alkyl groups are methyl groups.

3. The aqueous dispersion of claim 1, wherein the substituted silsesquioxane-based particles are free of (meth) acrylate copolymerized to the substituted silsesquioxane-based particles.

4. The aqueous dispersion of claim 1, wherein the concentration of the substituted silsesquioxane-based particles is 0.20 weight-percent or more and at the same time 25 weight-percent or less based on aqueous dispersion weight.

5. The aqueous dispersion of claim 1, wherein "a" and "d" are zero.

6. The aqueous dispersion of claim 1 wherein R in each occurrence is independently selected from a group consisting of methyl and phenyl.

7. A method comprising the step of applying the aqueous dispersion of claim 1 to a surface.

* * * * *

UNITED STATES PATENT AND TRADEMARK OFFICE
CERTIFICATE OF CORRECTION

| | | |
|---|---|---|
| PATENT NO. | : 12,103,990 B2 | Page 1 of 1 |
| APPLICATION NO. | : 17/299006 | |
| DATED | : October 1, 2024 | |
| INVENTOR(S) | : Zachary Kean et al. | |

It is certified that error appears in the above-identified patent and that said Letters Patent is hereby corrected as shown below:

In the Claims

In Claim 1, Column 15, Line 3, the reference to "cd" should read --"d"--.

Signed and Sealed this
Twenty-fifth Day of March, 2025

Coke Morgan Stewart
*Acting Director of the United States Patent and Trademark Office*